United States Patent [19]

Hertzer

[11] Patent Number: 4,907,960
[45] Date of Patent: Mar. 13, 1990

[54] HYDRAULIC SYSTEM FOR A TOGGLE-TYPE PLASTIC INJECTION MOLDING MACHINE CAPABLE OF PRECISION COINING

[75] Inventor: Ronald A. Hertzer, Milford, Ohio

[73] Assignee: Cincinnati Milacron Inc., Cincinnati, Ohio

[21] Appl. No.: 228,771

[22] Filed: Aug. 4, 1988

Related U.S. Application Data

[62] Division of Ser. No. 935,294, Nov. 26, 1986, abandoned.

[51] Int. Cl.⁴ .............................................. B29C 45/68
[52] U.S. Cl. ..................................... 425/593; 264/2.2
[58] Field of Search ............... 425/149, 150, 593, 808, 425/148; 264/2.2

[56] References Cited

U.S. PATENT DOCUMENTS

| 3,797,808 | 3/1974 | Ma et al. ............................ 425/148 |
| 4,364,878 | 12/1982 | Laliberte ............................ 425/808 |

FOREIGN PATENT DOCUMENTS

| 1539204 | 8/1967 | France . |
| 148055 | 11/1979 | Japan ................................. 264/2.2 |
| 53019 | 3/1986 | Japan ................................. 425/808 |

OTHER PUBLICATIONS

Engle Information, A-24-TV-4/75, "Sandwich Press Injection", Apr. 1975.
Les Lentilles Optiques En Plastique.
"Hydraulic Control Valves", John J. Pippenger, pp. 197–202, from Hydraulic and Pneumatic Power and Control, 1966 McGraw-Hill, Inc.

Primary Examiner—Jay H. Woo
Assistant Examiner—Timothy W. Heitbrink
Attorney, Agent, or Firm—Frost & Jacobs

[57] ABSTRACT

An improved computer controlled hydraulic system for a conventional toggle-operated plastic injection molding machine comprising an injection assembly and a mold clamping assembly. The hydraulic system includes a first low volume pump and a second high volume pump connected between a reservoir of hydraulic fluid and a pressure and flow control manifold. The output of the pressure and flow control manifold is connected to an injection control manifold, in turn connected to and operating the instrumentalities of the injection assembly. The output of the pressure and flow control manifold is also connected to a clamping control manifold, in turn connected to and operating the cylinder of the clamping assembly. An isolation manifold is connected between the pressure and flow control manifold and the clamping control manifold. A third low volume pump is connected between the reservoir and the isolation manifold. The isolation manifold is also connected to the reservoir. When unactuated, the isolation manifold connects the output of the pressure and flow control manifold directly to the clamping control manifold and recirculates the third pump to reservoir, when the machine is to perform sequential cycles such as conventional injection molding or conventional coining. When actuated, the isolation manifold disconnects the clamping manifold from the pressure and flow control manifold and connects the third pump to the clamping control manifold, enabling the machine to perform a coining cycle with individual and simultaneous clamping and injection control, and precise and repeatable position and speed control of the coining step.

6 Claims, 6 Drawing Sheets

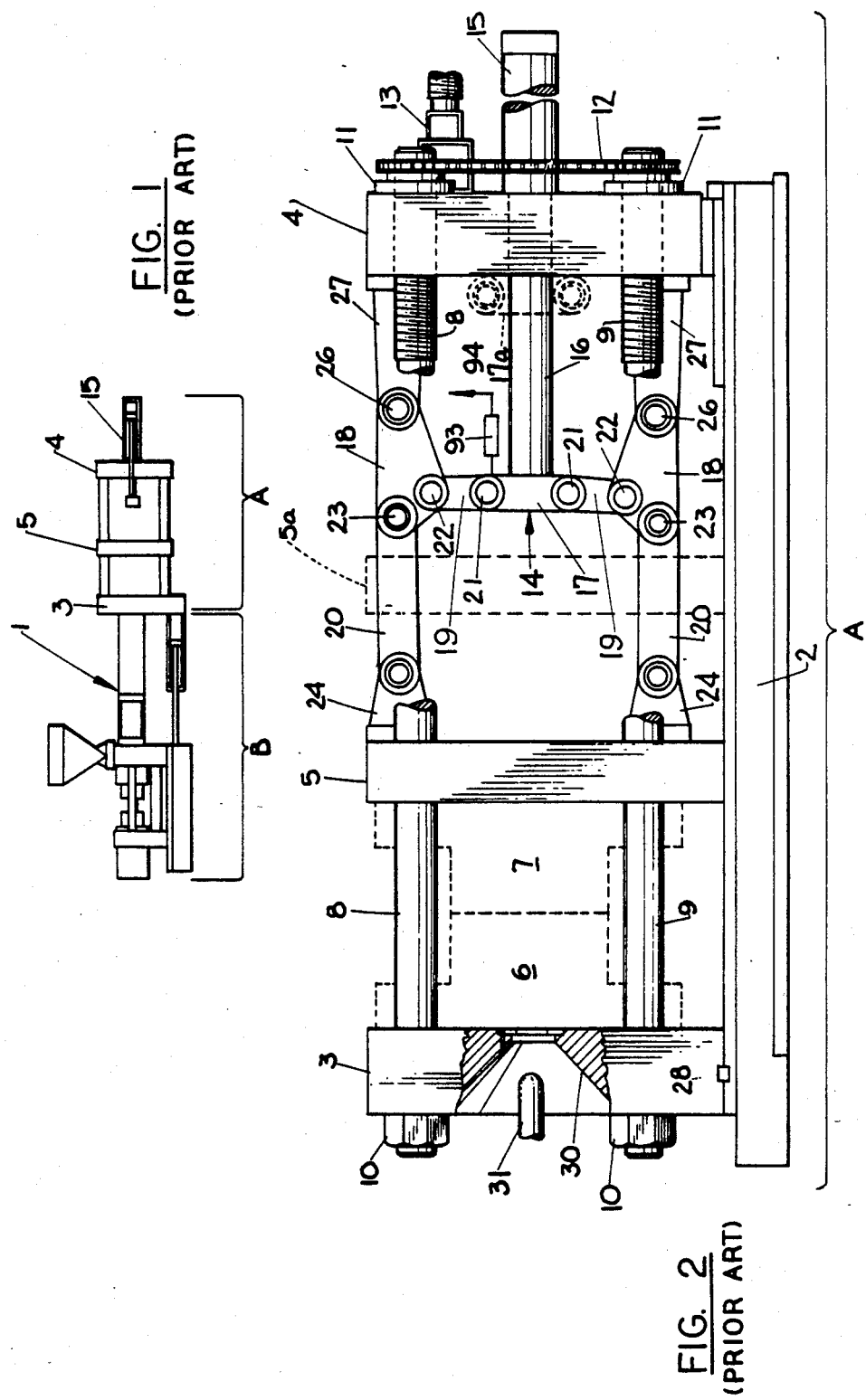

HYDRAULIC SYSTEM FOR A TOGGLE-TYPE PLASTIC INJECTION MOLDING MACHINE CAPABLE OF PRECISION COINING

This is a division of application Ser. No. 06/935,294, filed November 26, 1986, in the name of Ronald A. Hertzer, and entitled: HYDRAULIC SYSTEM FOR A TOGGLE-TYPE PLASTIC INJECTION MOLDING MACHINE CAPABLE OF PRECISION COINING, now abandoned.

TECHNICAL FIELD

The invention relates to an improved hydraulic system for a toggle-type plastic injection molding machine, and more particularly to a hydraulic system wherein the hydraulics for operating the plastication and injection assembly of the machine can be isolated from the hydraulics controlling the toggle-type mold clamping assembly of the machine, enabling the machine to perform a coining cycle with simulataneous clamping and injection control and precise and repeatable position and speed control of the coining step.

BACKGROUND ART

Prior art workers have devised toggle-type plastic injection molding machines which are hydraulically actuated and which are capable of performing ordinary injection molding cycles and simple coining cycles. In such machines, the hydraulics which activate the plastication and injection assembly of the machine and the toggle-type mold clamping assembly of the machine are inter-related. Such machines are capable of performing conventional injection molding cycles and simple coining cycles since both types of cycles are made up of a plurality of strictly sequential steps. In the ordinary injection molding cycle, the basic steps comprise mold clamping, injection, and mold opening. A coining cycle requires the use of a variable volume mold, as is well known in the art. The simple coining cycle is made up of the following sequential steps: mold close, inject, coin, and mold open.

It has been discovered that if in a coining cycle the coining and injection steps are accurately and repeatably controlled, and if during the coining step the volume of the mold is changed with accurate and repeatable speed and position control, higher quality products are produced. Such higher quality products are characterized by reduced stresses within the plastic material of the product, reduced surface imperfections, the substantial elimination of bubbles and an overall improved strength.

During a coining operation, the linear movement of the movable mold half of the variable volume mold is usually of the order of from about 1/32 inch to about ¼ inch. To divide such a small distance into a series of positions and to shift the movable mold half from one position to the next at different, controlled speeds requires the use of a toggle-type plastic injection molding machine since the mold position can be determined by determining the position of the cross head of the toggle mechanism, as will be described hereinafter. This is true because the cross head travels with respect to the travel of the movable mold half at a ratio of from about 10:1 to about 20:1.

The usual hydraulically controlled toggle-type plastic injection molding machine of the prior art is not capable of performing the above described precision coining cycle. The present invention provides a hydraulic control system capable of performing ordinary sequential injection molding cycles and simple sequential coining cycles. The hydraulic system is also capable of performing a precision coining cycle since the hydraulic instrumentalities controlling the mold clamping assembly of the machine can be isolated from the hydraulic instrumentalities controlling the injection assembly of the machine so that injection and clamping can be individually and simultaneously controlled with a high degree of repeatable precision.

DISCLOSURE OF THE INVENTION

According to the invention there is provided an improved computer controlled hydraulic system for a conventional toggle-type plastic injection molding machine. The conventional machine is of the type comprising an injection assembly and a mold clamping assembly. The hydraulic system comprises a first low volume pump and a second high volume pump. The intakes of these pumps are connected to a reservoir of hydraulic fluid. The outlets of these pumps are connected to a pressure and flow control manifold.

The output of the pressure and flow control manifold is connected to an injection control manifold. The injection control manifold, in turn, is connected to and operates the various instrumentalities of the injection assembly.

The output of the pressure and flow control manifold is also connected to a clamping control manifold. The clamping control manifold is connected to and operates the cylinder of the toggle-type mold clamping assembly.

An isolation manifold is connected between the pressure and flow control manifold and the clamping control manifold. A third low volume pump is provided with its intake connected to the reservoir and its outlet connected to the isolation manifold. The isolation manifold, itself, is also connected to the reservoir.

The isolation manifold has an unactuated state and an actuated state. In its unactuated state, the isolation manifold connects the output of the pressure and flow control manifold directly to the clamping control manifold. At the same time, the isolation manifold simply recirculates the third pump to the reservoir. With the isolation manifold in its unactuated state, the hydraulics controlling the injection unit and the hydraulics controlling the clamping unit are interconnected and the machine is capable of performing sequential cycles such as a conventional injection molding cycle or a simple conventional coining cycle.

In its actuated state, the isolation manifold disconnects the clamping manifold from the output of the pressure and flow control manifold and connects the third pump to the clamping control manifold. In this way, the hydraulics controlling the clamping assembly of the machine are isolated from the hydraulics controlling the injection assembly of the machine. As a result, the machine is capable of performing a coining cycle with individual and simultaneous clamping and injection control and precise and repeatable position and speed control of the movable half of the variable volume mold during the coining step.

BRIEF DESCRIPTION OF THE DRAWINGS

FIG. 1 is a semi-diagrammatic side elevational view of a conventional toggle-type plastic injection molding machine.

FIG. 2 is a simplified, fragmentary, side elevational view of the toggle-type mold clamping assembly of the machine of FIG. 1.

DETAILED DESCRIPTION OF THE INVENTION

Figure 3:
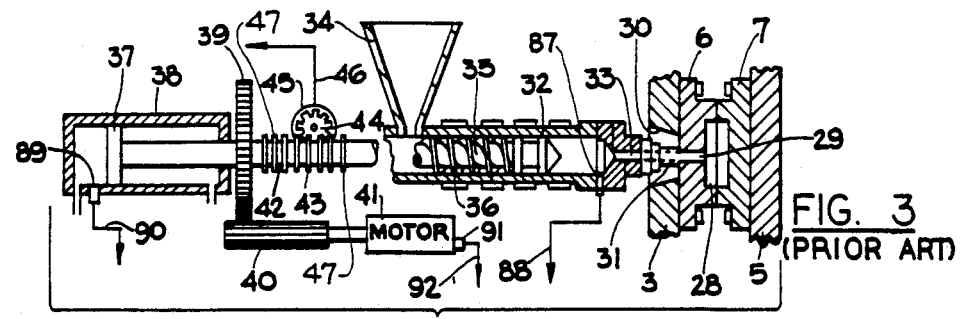
FIG. 3 is a simplified, fragmentary, cross sectional elevational view of an exemplary injection assembly of the machine of FIG. 1.

Toggle-type plastic molding machines are well known in the art. In simplified form, an exemplary toggle-type plastic molding machine is illustrated in FIG. 1 and is generally indicated by index numeral 1. The toggle-type plastic molding machine is made up of two primary components, the clamping assembly A and the injection assembly B.

An exemplary clamping assembly is described in copending application Ser. No. 842,954, filed March 24, 1986, now U.S. Pat. No. 4,685,876 in the name of Anthony Locsei and entitled TOGGLE INJECTION MOLDING CLAMPING FORCE MONITOR. The teachings of this copending application are incorporated herein by reference.

Such a clamping assembly A is illustrated in simplified form in FIG. 2. The clamping assembly comprises a horizontal frame 2 on which are mounted three platens: a fixed or nozzle platen 3, a clamp or back platen 4 and a moving platen 5. A pair of mold halves 6 and 7 are mounted on the nozzle platen 3 and the moving platen 5, respectively. The nozzle platen 3 and the clamp platen 4 are joined by four tie bars, two of which are illustrated at 8 and 9. The tie bars pass through moving platen 5 with a sliding fit. As a consequence, the tie bars act as a guide for moving platen 5.

The tie bars are connected to the nozzle platen 3 by tie bar nuts 10. That portion of each of the four tie bars which extends through the back platen 4 is threaded, as shown. At the outside surface of back platen 4, each tie bar is provided with an adjusting nut and sprocket 11. An endless chain 12 passes about the sprocket 11 of each of the four tie bars and the gear (not shown) of a die height adjustment motor 13. Adjustment motor 13 may be hydraulic, if desired. Since the chain 12 connects motor 13 with all four tie bars, the motor 13 can be used to adjust all of the tie bars simultaneously in setting die height (and thus clamping force). Motor 13 can also be used to make die height adjustment during operation. Die height or clamping force can change during operation due to the affect on machine dimensions caused by temperature of the mold or the tie bars.

A toggle system, generally indicated at 14, connects moving platen 5 with clamp platen 4. The toggle system 14 is driven by a hydraulic clamp cylinder 15, the piston rod 16 of which reciprocates the toggle cross head 17.

The toggle linkage comprises a symmetrical system of links having on each side of center a ternary link 18 and two different binary links 19 and 20. Each of the first or connecting binary links 19 is pivotally connected to the cross head 17 as at 21, and is pivotally connected to the adjacent ternary link as at 22. Each of the second or long binary links 20 is pivoted to the adjacent ternary link 18 as at 23 and to a steeple 24 (mounted on movable platen 5). Finally, each ternary link 18 is pivotally connected as at 26 to a steeple 27 affixed to the clamp platen 4. There may be plural toggle linkages of like structure disposed across the machine and connected to the same cross head.

The platens 3, 4 and 5 rest on the machine frame 2, the upper surface of which provides a pair of longitudinal, parallel ways (not shown) on which the moving platen 5 is supported and reciprocates. The nozzle platen is preferably keyed to frame 2, as at 28. The clamp platen 4 is movably mounted on frame 2, enabling it to be shifted therealong during clamp adjusting.

In FIG. 2, moving platen 5 and crosshead 17 are shown in solid lines in their forwardmost positions. They are also shown in broken lines at 5a and 17a in their retracted positions. It will be noted that when moving platen 5 is in its extendedmost or clamping position, each pivot 23 is in line with its respective pivots 25 and 26.

An exemplary injection assembly, such as injection assembly B of FIG. 1, is taught in U.S. Pat. No. 3,797,808. The teachings of this patent are incorporated herein by reference. An exemplary injection assembly B is illustrated in FIG. 3. In FIG. 3, nozzle platen 3 and moving platen 5 are illustrated, together with mold halves 6 and 7. Mold halves 6 and 7 are shown in their closed positions with moving platen 5 at its extendedmost or clamping position. When closed, mold halves 6 and 7 define a mold cavity 28.

Mold half 6 includes a gate and runner 29 providing communication between mold cavity 28 and a tapered bore 30 through nozzle platen 3. Located within the tapered bore 30 of nozzle platen 3 is a nozzle 31 which communicates with the gate and runner of mold half 6. The nozzle 31 is attached to a cylindrical barrel 32, having at its end an aperture 33 which connects the inside of barrel 32 with nozzle 31. A shut-off valve (not shown) can be provided in association with passage 33, if desired, to permit communication between the interior of barrel 32 and mold cavity 28 only a predetermined times. Finally, barrel 32 is provided with a hopper 34 into which the material to be plasticated is loaded.

Slidably and rotatably positioned within barrel 32 is a screw 35. Screw 35 includes one or more external, helically disposed flights 36 by which the plastic molding material is transported within barrel 32 to passage 33. That end of screw 35 most remote from passage 33 supports a piston 37 located within a cylinder 38. Piston 37 and cylinder 38 enable the screw 35 to be reciprocated between a retracted position (to the left as viewed in FIG. 3) and an extended position (toward the right as viewed in FIG. 3). When hydraulic fluid under pressure is introduced into cylinder 38 in such a way as to shift screw 35 to its extended position, screw 35 injects the plasticated material from within barrel 32 into mold cavity 28.

A gear 39 is keyed or otherwise non-rotatably affixed to screw 35 and is meshed with a driving pinion 40, driven by an appropriate motor 41. Motor 41 can be an electric motor or preferably a hydraulic motor. In this manner, screw 35 is capable of rotation by virtue of motor 41. In addition, a series of alternating circular grooves 42 and annular ridges 43 are formed on screw 35, and are engaged by a gear 44 affixed to a linear position transducer 45. The axial position of screw 35 is monitored by position transducer 45, which provides an electrical signal 46 proportional thereto.

The operation of injection assembly B can be described as follows. The plastic molding material to be plasticated is located in hopper 34 and screw 35 is caused to rotate by means of motor 41. In this way, screw 35 performs mechanical work on the material to be plasticated, thereby heating it and causing it to become soft and flowable. At the same time, screw 35 transports the material within barrel 32 toward passage 33. Band-type heaters 47 may be located about the exterior of barrel 32, as is known in the art, in order to maintain the barrel at a uniform high temperature to prevent heat loss from the plasticated material therein. As the plasticated material is transported forwardly in barrel 32, it accumulates in front of screw 35, causing the screw to move toward its retracted position with increasing accumulation of the molten material. When the screw shifts toward its retracted position by a predetermined distance which provides a volume of molten plasticated material sufficient to fill mold cavity 28, rotation of screw 35 is stopped and hydraulic pressure is introduced into cylinder 38 so as to cause screw 35 to shift to its extended position (i.e., to the right in FIG. 3), thereby forcing the plasticated material through passage 33, nozzle 31 and mold passage 29 into mold cavity 28. The material in mold cavity 28 is permitted to cool, and the part is removed therefrom, whereupon the plastication cycle begins again.

Figure 4:
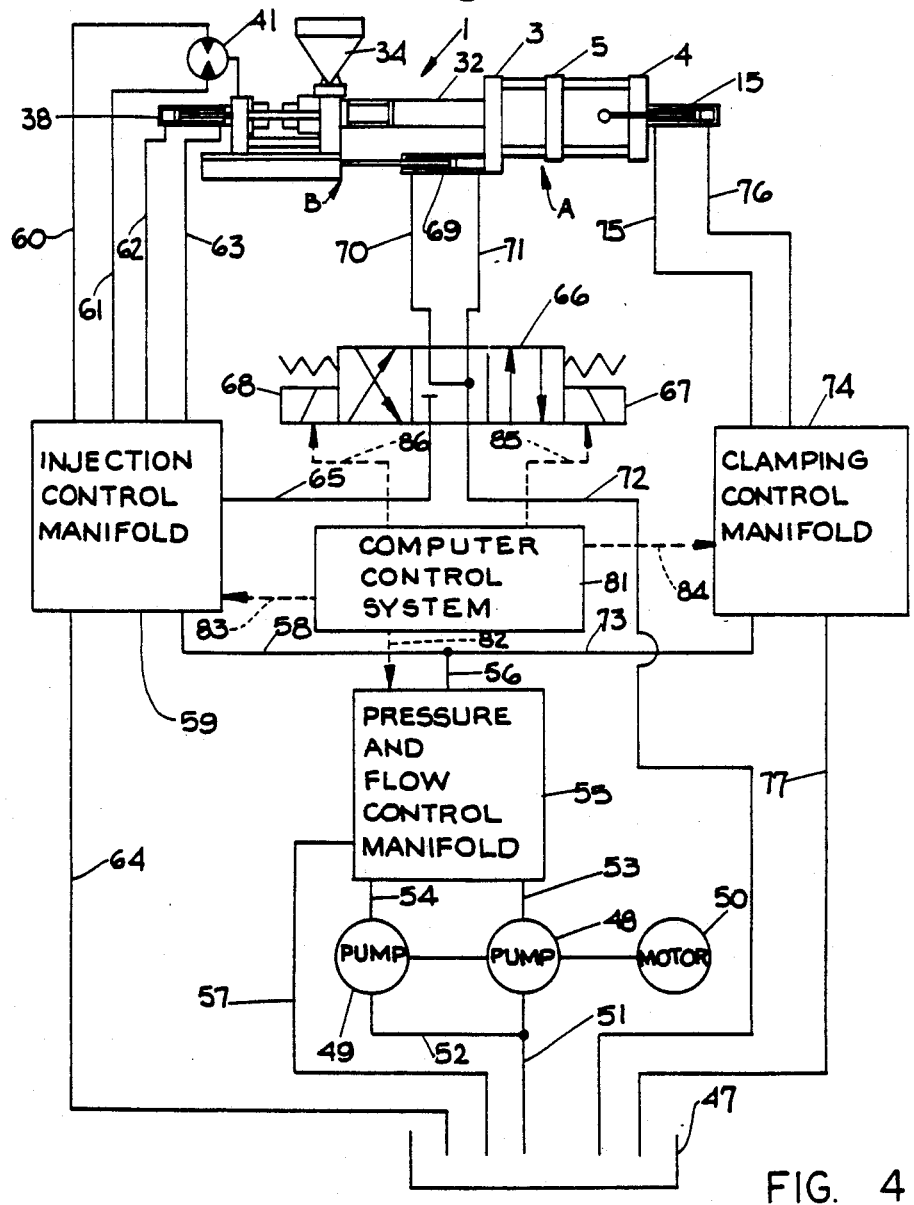
FIG. 4 is a simplified diagrammatic representation of a conventional hydraulic system for the machine of FIG. 1.

Reference is now made to FIG. 4 which is a simplified, diagrammatic representation of the hydraulic system utilized to operate a conventional toggle-type plastic molding machine. The hydraulic system comprises a reservoir 47 for hydraulic fluid. This system is provided with a high volume pump 48 and a low volume pump 49, both driven by a prime mover or motor 50. The intakes of pumps 48 and 49 are connected to the reservoir as at 51 and 52. The outlets of pumps 48 and 49 are connected as at 53 and 54 to a pressure and flow control manifold 55. The pressure and flow control manifold comprises a plurality of valves controlling the pressure and flow of hydraulic fluid at the output 56 of the pressure and flow control manifold. The pressure and flow control manifold is conventional and the valve arrangement thereof does not constitute a part of the present invention and can take any appropriate form as is known in the art. The pressure and flow control manifold is also provided with a return line 57 to reservoir 47.

The output 56 of the pressure and flow control manifold 55 is connected, as at 58, to an injection control manifold 59. The injection control manifold 59 comprises a plurality of valves to control hydraulic motor 41 and cylinder 38 (see also FIG. 3). To this end, the injection control manifold 59 is connected to hydraulic motor 41 as at 60 and 61. Similarly, the injection control manifold 59 is connected to cylinder 38 as at 62 and 63.

Again, any appropriate valving to adequately control motor 41 and cylinder 38 can be used and the precise nature of the valving in the injection control manifold 59 does not constitute a part of the present invention. The injection control manifold will also be connected to reservoir 47, as at 64.

The injection control manifold 59 is additionally connected as at 65 to a directional valve 66. Directional valve 66 is actuated by solenoids 67 and 68. Directional valve 66 is connected to a cylinder and piston assembly 69 as at 70 and 71. Valve 66 is also connected as at 72 to reservoir 47. The purpose of cylinder and piston assembly 69 is to shift the clamping assembly A and the injection assembly B of the toggle-type plastic molding machine 1 toward and away from each other when the machine 1 is not operating, thereby permitting access to nozzle 31 (see FIG. 3). Thus, if solenoid 68 is actuated, valve 66 will shift such that hydraulic fluid will flow from line 65 through line 71 to that side of the piston cylinder assembly 69 resulting in movement of injection assembly B and clamping assembly A away from each other. Similarly, if solenoid 67 is actuated, directional valve 66 will shift in such a way that hydraulic fluid from line 65 will flow through line 70 to that side of cylinder and piston assembly 69 causing the injection assembly B and clamping assembly A to move toward each other. As is shown in FIG. 4, when directional valve 66 is in its normal, centered position, both sides of piston-cylinder assembly 69 will be connected to reservoir 47 by lines 70, 71 and 72.

The output 56 of pressure and flow control manifold 55 is also connected, as at 73 to clamping control manifold 74. Clamping control manifold 74 comprises appropriate valving to control cylinder 15 of the clamping assembly A of the toggle-type plastic molding machine 1, and thus movement of cross head 17, moving platen 5 and mold half 7 affixed thereto (see also FIG. 2). To this end, clamping control manifold 74 is connected to cylinder 15 as at 75 and 76. Clamping control manifold 74 is also connected to reservoir 47 as at 77.

Figure 5:
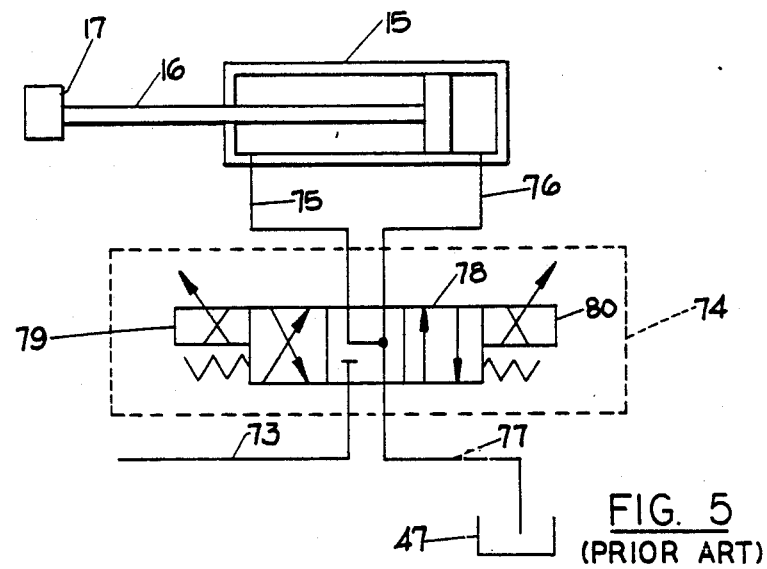
FIG. 5 is a simplified diagrammatic representation of an exemplary prior art clamping control manifold for use in the system of FIG. 4.

An exemplary form of clamping control manifold is diagrammatically illustrated in FIG. 5. Like parts have been given like index numerals. In the embodiment of FIG. 5, clamping control manifold 74 comprises a proportional directional valve 78. The proportional directional valve 78 is actuated by solenoids 79 and 80. As will be apparent in FIG. 5, if solenoid 79 is energized, hydraulic fluid from the outlet 56 of pressure and flow control manifold 55 will be introduced via line 73 and line 76 to the right side of cylinder 15 (as viewed in FIG. 5) and the left side of cylinder 15 will be connected to reservoir 47. This will cause piston rod 16 and cross head 17 to shift to the left as viewed in FIG. 5, shifting moving platen 5 and mold half 7 toward the mold closed position. If solenoid 80 is energized, the proportional directional valve 78 will be shifted to a position wherein fluid from the outlet 56 of pressure and flow control manifold 55 will pass via line 73 and line 75 to the left side of cylinder 15 (as viewed in FIG. 5), the right side of cylinder 15 being connected to reservoir 47. This, in turn, will cause the piston rod and cross head to shift to the right as viewed in FIG. 5. This, in turn, results in the shifting of moving platen 5 and mold half 7 toward their open positions. A proportional directional valve 78 is used so that mold half 7 can be moved rapidly toward its closed position with reduction in speed of movement as it approaches its closed position.

It will be understood by one skilled in the art that the hydraulic system described with respect to FIGS. 4 and 5 is basic only. The hydraulic system may include other manifolds for additional purposes or operations. For example, the system may be provided with a gate valve safety manifold operative to preclude movement of the moving platen 5 should a protective door or cover over the clamping assembly A of machine 1 be opened. The hydraulic system may include a manifold for the operation of a part ejection means, as is well known in the art. The hydraulic system may also include a manifold for the control of core shifting means in association with the molds, if desired. All of these elements are known in the art and have not been illustrated in the Figures since they do not constitute a part of the present invention.

It will be understood that a control system must be provided to operate the various valves comprising the pressure and flow control manifold 55, the injection control manifold 59, the clamping control manifold 74 and the directional valve 66. While the control system can take any appropriate form, it is common practice today to utilize a computer control system provided with appropriate software. Such a computer control system is diagrammatically indicated at 81 in FIG. 4. Such computer control systems are well known in the art and the precise nature of the control system 81 does not constitute a limitation of the present invention. Suffice it to say that the computer control system will have output signals controlling the valves of the pressure and flow control manifold 55, the injection control manifold 59 and the clamping control manifold 74. Such output signals are diagrammatically indicated by dashed arrows 82, 83 and 84, respectively. Additional output signals 85 and 86 are shown to control the solenoids 67 and 68, respectively, of directional valve 66.

The computer control system 81 will also receive input data from various parts of the machine 1. For example, as is described in the above noted U.S. Pat. No. 3,797,808, the injection assembly B of machine 1, as shown in FIG. 3, may be provided with a temperature transducer 87 monitoring the melt temperature, and having an output signal 88. Mention has already been made of linear position transducer 45 with its output signal 46. The back pressure in cylinder 38 may be monitored by a pressure transducer 89 having an output signal 90. Finally, the speed of motor 41 may be sensed by a tachometer 91 having an output signal 92. Inputs from all of these sources are utilized by computer control system 81 to control and optimize the injection operation of the machine 1. Referring to FIG. 2, a position transducer is diagrammatically indicated at 93, having an output signal 94. Output signal 94 will inform the computer of the position of the cross head 17 at any given time.

The hydraulic system illustrated and described with respect to FIGS. 4 and 5 for the toggle-type plastic molding machine 1 is sufficient to enable the machine 1 to perform ordinary injection molding operations. An ordinary injection molding operation is made up of three basic parts or steps: (1) mold close and clamp; (2) injection of plasticated material into the mold cavity; and (3) mold open. Since these steps are strictly sequential, the same pumps 48 and 49 and the output from pressure and flow control manifold 55 can be utilized in each of these steps.

In a conventional coining operation, utilizing a variable volume mold, the machine 1 performs the following basic steps: (1) mold close; (2) injection of plasticated material into the mold cavity; (3) coining; and (4) mold open.

The hydraulic system described with respect to FIGS. 4 and 5 is not capable of performing such a conventional coining operation since the clamping control manifold 74 is not capable of maintaining the movable platen 5 and mold half 7 in mold closed position during injection. This is true because, as is clear from FIG. 5, when the proportional directional valve 78 is in its normal centered position, both lines 75 and 76 to both sides of cylinder 15 are connected to reservoir 47.

Figure 6:
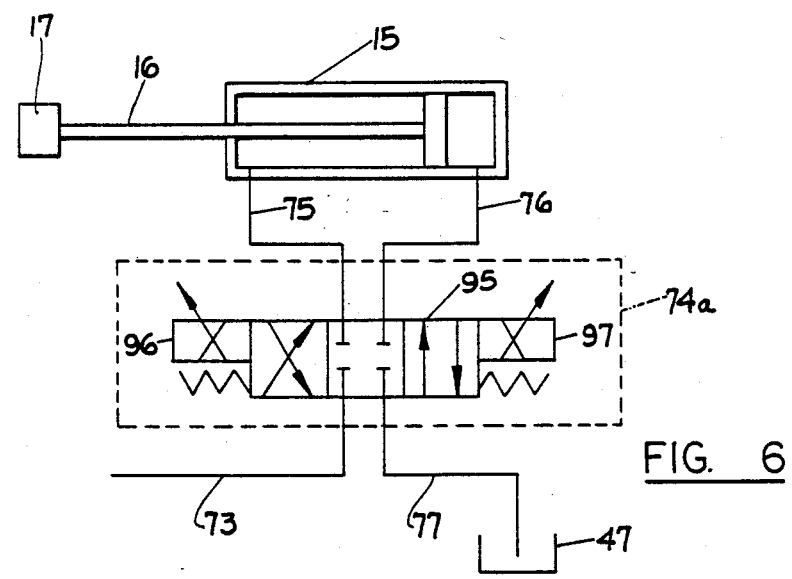
FIG. 6 is a simplified diagrammatic representation of another form of clamping control manifold usable in the hydraulic system of FIG. 4.

The hydraulic system of FIG. 4 can be modified to perform the above described simple coining operation by modifying the clamping control manifold 74 in the manner illustrated in FIG. 6. The clamping control manifold 74a of FIG. 6 differs from the clamping control manifold 74 of FIG. 5 in that it comprises a proportional directional center blocked valve 95. The proportional directional center blocked valve 95 is operated by solenoids 96 and 97. It will be apparent from FIG. 6 that if solenoid 96 is energized, valve 95 will be so shifted that hydraulic fluid from output 56 of pressure and flow control manifold 55 and line 73 will enter the right end of cylinder 15 (as viewed in FIG. 6) via line 76. This will result in piston rod 16, cross head 17, and attached moving platen 5 and mold half 7 (not shown) shifting to the left in FIG. 6 toward a mold closed position. The left side of cylinder 15 (as viewed in FIG. 6) will be connected via line 75 to line 77 and reservoir 47. If solenoid 97 is energized, the valve 95 will shift in such manner that hydraulic fluid from the output 56 of pressure and flow control manifold 55, via lines 73 and 75, will enter the left side of cylinder 15 (as viewed in FIG. 6) causing piston rod 16, cross head 17, and attached moving platen 5 and mold half 7 (not shown) to move toward a retracted, mold-open position. At the same time, the right side of cylinder 15 (as viewed in FIG. 6) will be connected via lines 76 and 77 to reservoir 47. When valve 95 is in its centered, unactuated position, it will be noted that lines 75, 76, 73 and 77 are blocked, as illustrated in FIG. 6. This enables the proportional directional center blocked valve 95 to maintain cross head 17 and attached moving platen 5 and mold half 7 in any desired position, including the initial mold closed position during injection. Each of the steps of the simple coining operation outlined above can be performed by the same pumps 48 and 49 and the output 56 of pressure and flow control manifold 55 since the above outlined steps are strictly sequential.

As indicated above, in instances where a product of high quality is desired or required, it has been determined that the best quality can be achieved when injection and coining are performed with precise and repeatable control of speed and position of the movable mold half of a variable volume mold. This is diagrammatically illustrated in FIG. 7.

Figure 7:
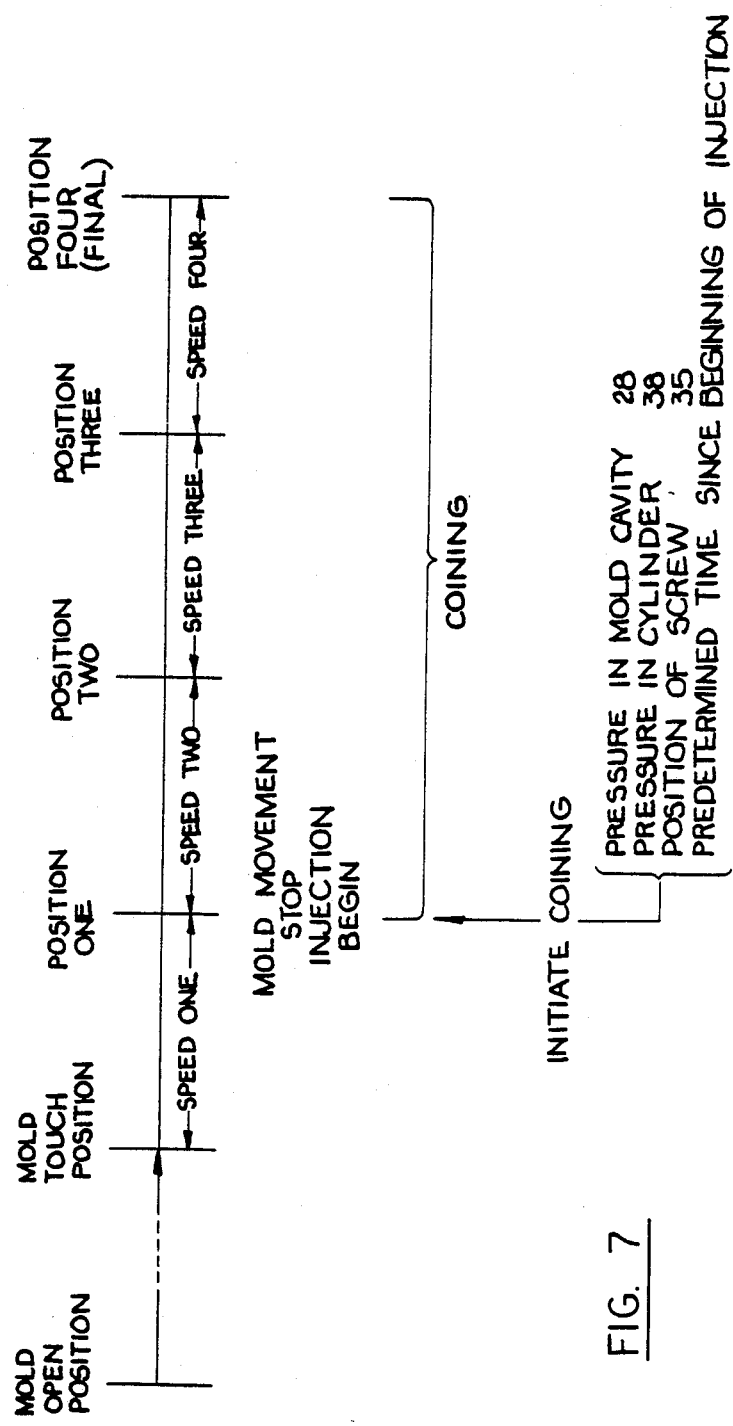
FIG. 7 is a diagrammatic representation of the precision coining cycle of the present invention.

Referring both to FIG. 2 and to FIG. 7, and assuming that the mold 6-7 is a variable volume mold, cylinder 15 is actuated in a conventional manner to cause moving platen 5 to shift the movable mold half 7 from an open position to a mold touch position, wherein the movable mold half 7 just touches the fixed mold half 6 of the variable volume mold. It is from the mold touch position to the final position of mold half 7 that the speed and position of mold half 7 are to be carefully controlled. In the diagram of FIG. 7 positions 1 through 4 are illustrated. It has been determined that to provide two intermediate positions between position 1 and the final position is adequate for most molding operations, although additional intermediate positions could be provided, if desired.

The movable mold half 7 of the variable volume mold is shifted from the mold touch position to position 1 at controlled speed 1. Movement of mold half 7 at controlled speed 1 enables the mold half 7 to achieve position 1 with a very high degree of accuracy and repeatability. It will be understood that position 1 is critical because it will determine the distance over which coining is performed.

The movable mold half 7 is stopped at position 1 and injection of the plasticated material into the mold cavity is begun. Achievement of position 1 will be sensed by position transducer 93 (see FIG. 2), and the output signal 94 of position transducer 93 will cause the computer control system of the molding machine to initiate injection.

To initiate the coining operation, the computer control system of the molding machine will be programmed with a predetermined dwell time since the beginning of injection. When the dwell time has elapsed, the computer control system will initiate coining. The coining step may also be initiated by the achievement of another set point. For example, coining could be initiated by the achievement of a predetermined pressure within mold cavity 28, as sensed by a pressure transducer 98 located with one of the mold halves and having an output signal 99 (see FIG. 2). Coining could be initiated by the achievement of a predetermined pressure within injection cylinder 38, as sensed by pressure transducer 89 (see FIG. 3). Similarly, coining could be initiated upon the achievement of a predetermined position of injection screw 35, as sensed by linear position transducer 45 (see FIG. 3).

No matter which set point is used to initiate coining, i.e., a signal from pressure transducer 98, a signal from pressure transducer 89, or a signal from position transducer 45, should that signal not occur within the predetermined dwell time since the beginning of injection, elapse of the dwell time will override and initiate the coining step. Upon initiation of the coining step, the movable mold half 7 will be shifted to position 2 at controlled speed two; from position 2 to position 3 at controlled speed three; and from position 3 to position 4 (the final position) at controlled speed four.

It will be understood by one skilled in the art that positions 1 through 4 and speeds one through four will be appropriately programmed in the computer control system. These position and speed set points will vary depending upon the nature of the product being produced and the nature of the plasticated material. The establishment of optimum speed and position set points can readily be accomplished by one skilled in the art by a series of simple experimental cycles.

Figure 8:
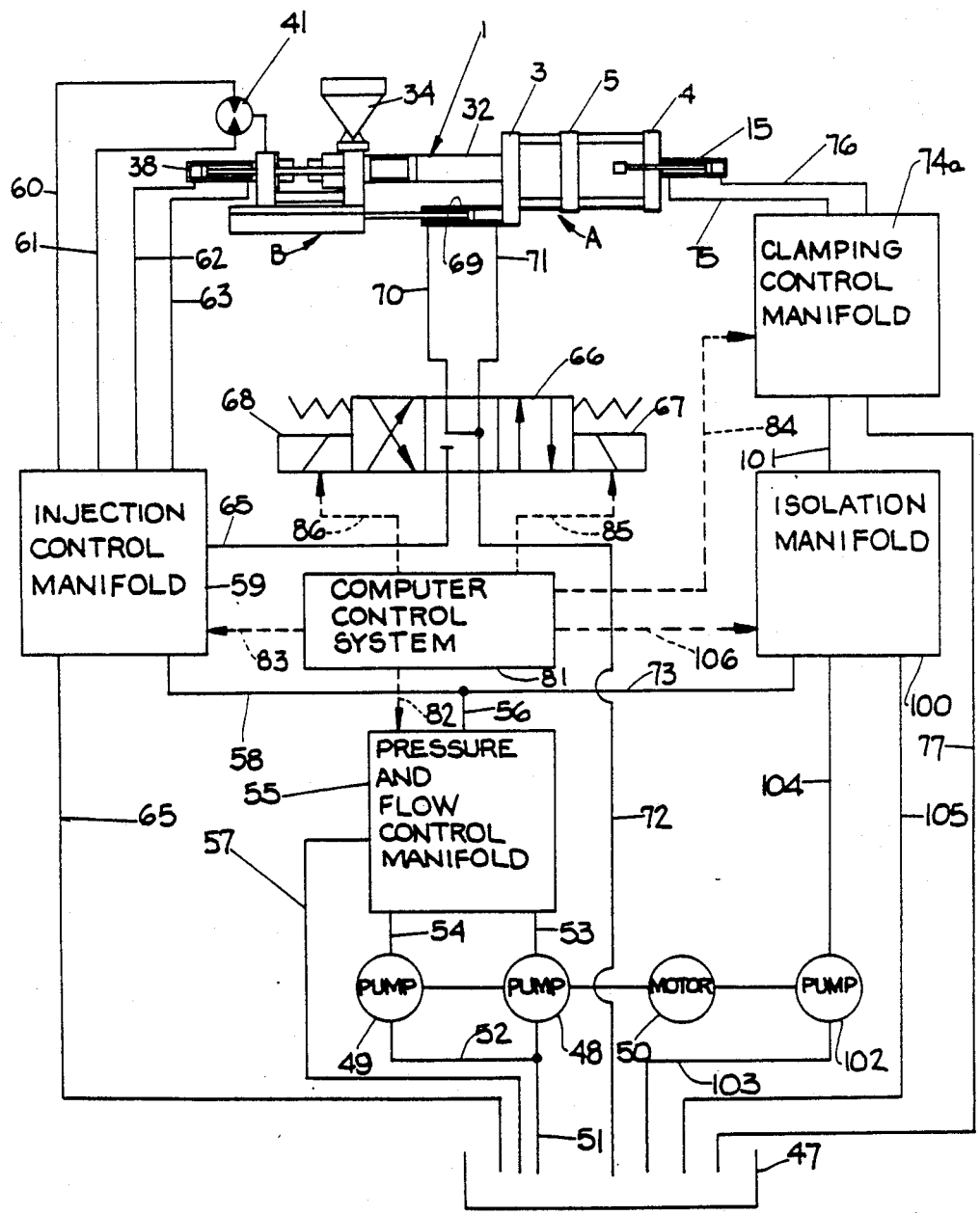
FIG. 8 is a simplified diagrammatic representation of the hydraulic system of the present invention, capable of performing the precision coining cycle of FIG. 7.

A hydraulic system for a toggle-type plastic molding machine enabling the accomplishment of the speed and position controlled injection and coining steps of FIG. 7, is illustrated in FIG. 8. It will be noted that much of FIG. 8 is identical to the hydraulic system of FIG. 4 and like parts have been given like index numerals. Thus, pumps 48 and 49, pump motor 50, pressure and flow control manifold 55, injection control manifold 59, and directional valve 66 remain unchanged. Clamping control manifold 74a is of the type illustrated and described with respect to FIG. 6.

The problem lies in the fact that the steps outlined in FIG. 7, unlike those outlined above with respect to an ordinary injection molding cycle and as simple injection molding and coining cycle, are not strictly sequential and require simultaneous control and operation of clamping assembly A and injection assembly B of the toggle-type plastic molding machine 1. To this end, an isolation manifold 100 is provided. The line 73 from the output 56 of pressure and flow control manifold 55 is connected to the isolation manifold. The isolation manifold, in turn, is connected as at 101 to the clamping control manifold 74a. In addition, a second low volume pump 102 is provided. The intake of pump 102 is connected to reservoir 47 as at 103. The outlet of pump 102 is connected to the isolation manifold 100 as at 104. The isolation manifold is connected to reservoir 47 by line 105. Finally, the isolation manifold is actuated by signals from the computer control system 81, which signals are represented by dashed arrow 106.

Figure 9:
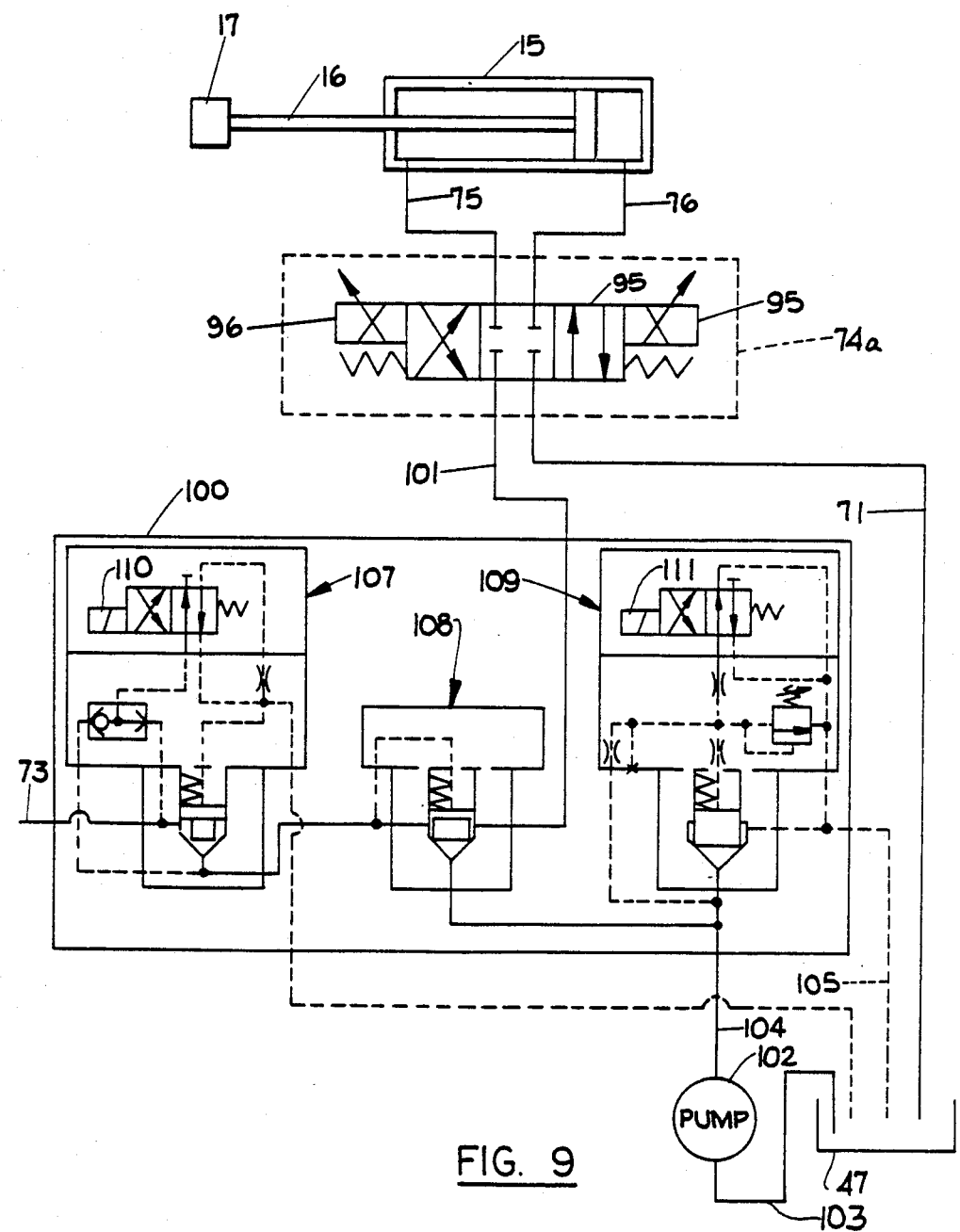
FIG. 9 is a simplified diagrammatic representation of the clamping control manifold and the isolation manifold of FIG. 8.

Reference is now made to FIGS. 8 and 9. FIG. 9 illustrates cylinder 15 of the clamping assembly A of machine 1, together with clamping control manifold 74a, isolation manifold 100, low volume pump 102 and reservoir 47. As indicated above, cylinder 15 and clamping control manifold 74a are the same as shown and described with respect to FIG. 6. Isolation manifold 100 comprises three valve assemblies generally indicated at 107, 108 and 109. Valve assembly 107 is actuated by solenoid 110. In its normal, unactuated condition, valve assembly 107 connects line 73 from output 56 of pressure and flow control manifold 55 through valve assembly 108 to the clamping control manifold 74a via line 101. Valve assembly 108 comprises a check valve. In its actuated condition, valve assembly 107 blocks line 73, disconnecting isolation manifold 100 from output 56 of the pressure and flow control manifold 55. Valve assembly 109 is actuated by solenoid 111. In its normal unactuated condition, valve assembly 109 connects low volume pump 102 back to reservoir 47 via line 105. In its actuated condition, valve assembly 109 connects pump 102 through check valve assembly 108 and line 101 to clamping control manifold 74a. It will be understood that valve assemblies 107 and 109 will be controlled by signals 106 from computer control system 81. Valve assembly 109 also provides a tonage limit safety which, if the tonage exceeds the rated value, automatically connects pump 102 to reservoir 47.

The embodiment of FIGS. 8 and 9 having been described in detail, its operation can now be set forth. The embodiment of FIGS. 8 and 9 can be used in a simple injection molding cycle comprising the sequential steps of mold clamping, injection and mold opening. Under these circumstances, valve assemblies 107 and 109 of isolation manifold 100 will remain unactuated throughout the cycle. As a result, line 73 from output 56 of pressure and flow control manifold 55 will be connected by valve assemblies 107 and 108 to line 101 leading to clamping control manifold 74a. At the same time, isolation manifold valve assembly 109 will cause low volume pump 102 to simply recirculate to reservoir 47. In essence, the result is as though isolation manifold 100 and pump 102 were not present and the hydraulic system was similar to that illustrated in FIG. 4.

Computer control system 81 will send appropriate signals 82 to the pressure and flow control manifold 55 and, via signals 84, will energize solenoid 96 of proportional directional center blocked valve 95 causing cylinder 15 to close and clamp mold halves 6 and 7. The fact that valve 95 is a proportional directional valve allows movable mold half 7 to be moved rapidly from its open position and thereafter slowed down at closing to reduce cycle time. Thereafter, the computer control system 81 will send appropriate signals to pressure and flow control manifold 55 and injection control manifold 59 to provide the injection step. Finally, the computer control system 81 will send appropriate signals to pressure and flow control manifold 55 and clamping manifold 74a to open the molds.

The embodiment of FIGS. 8 and 9 can also be utilized to perform a simple conventional coining cycle employing a variable volume mold and made up of the steps of mold closing, injection, coining and mold opening. Again, the isolation manifold valve assemblies 107 and 109 will remain unactuated. Computer control system 81 will send appropriate signals to pressure and flow control manifold 55 and clamping control manifold 74a to cause the molds to close. Thereafter, the computer control system will send appropriate control signals to the pressure and flow control manifold and the injection control manifold to perform the injection step. At this point, the clamping control manifold 74a and pressure and flow control manifold 55 will receive appropriate signals from computer control system 81 resulting in the coining step. Additional signals from the computer control system 81 to the last mentioned manifolds will result in the mold opening step.

In the performance of the coining cyle diagrammatically illustrated in FIG. 7, valve assemblies 107 and 109 of isolation manifold 100 will initially remain unactuated and the movable mold half 7 of the variable volume mold will be brought to the mold touch position by appropriate signals from computer control system 81 to pressure and control manifold 55 and clamping control manifold 74a. Upon achievement of the mold touch position as sensed by linear position transducer 93 (see FIG. 2), signals 106 from computer control system 81 will actuate isolation manifold valve assemblies 107 and 109. As a result of this, the clamping control manifold 74a will no longer be connected to the output 56 of pressure and flow control manifold 55 but rather will be connected to low volume pump 102. Thus, cylinder 15 of clamping assembly A of machine 1 will be controlled by clamping control manifold 74a and pump 102, while the injection assembly B of machine 1 will be controlled by injection control manifold 59, pressure and flow control manifold 55 and pumps 48 and 49. At this point, movable mold half 7a will be shifted very precisely to position 1 (as sensed by linear position transducer 93) at controlled speed 1 through the agency of signal 84 from computer control system 81 and proportional directional valve 95. With movable mold half 7 at position 1, the computer control system through appropriate signals to pressure and flow control manifold 55 and injection control manifold 59 will begin the injection step. Computer control system 81 will simultaneously begin to count off the predetermined dwell time since the beginning of injection. The computer control system 81 will initiate coining upon receipt of a signal from pressure transducer 98 within mold cavity 28 or pressure transducer 89 within cylinder 38 or a signal from linear position transducer 45, depending upon the set point used. Should a signal from the chosen set point not occur prior to expiration of the predetermined dwell time since the beginning of injection, the computer control system will initiate coining upon the expiration of the dwell time. Upon initiation of coining, injection will be continued to completion by pumps 48 and 49, pressure and flow control manifold 55 and injection control manifold 59. During the coining step, the movable die half 7 will be shifted through position 2 and position 3 to position 4 (the final position) at preprogrammed controlled speed two, speed three and speed four, respectively. This is accomplished by pump 102, isolation manifold 100 and clamping control manifold 74a. Positions two, three and four are sensed by the linear position transducer 98. Speeds two, three and four are controlled by signal 84 from computer control system 81 and proportional directional valve 95.

After coining is completed the movable die half 7 is retracted by the clamping assembly to its open position. Normally the isolation manifold 100 will be deactivated and mold opening will be accomplished by pumps 48 and 49, pressure and flow control manifold 55 and clamping control manifold 74a. Retraction of the movable mold half 7 could be accomplished by pump 102, isolation manifold 100 and clamping control manifold 74a, if desired.

It will be apparent from the above description that the embodiment of FIGS. 8 and 9 provides very precise and repeatable position and speed control of the movable die half 7 from the mold touch position through the coining operation with simultaneous control of the injection step. In other words, additional pump 102 and isolation manifold 100 enable the hydraulic system to simultaneously control mold half movement and injection with very precise control of the coining step with respect to position and speed.

Modifications may be made in the invention without departing from the spirit of it.

What we claim is:

1. A hydraulic system for a toggle operated plastic injection molding machine having a hydraulically actuated injection assembly and a hydraulically actuated toggle operated mold clamping assembly, said hydraulic system comprising a reservoir for hydraulic fluid, a first pump being a low volume pump and a second pump being a high volume pump, each of said first and second pumps having an inlet and an outlet, said pump inlets being connected to said reservoir, means for controlling the pressure and flow of hydraulic fluid from said outlets of said first and second pumps, means to operate said hydraulically actuated injection assembly by said controlled hydraulic fluid from said first and second pumps, and means to operate said hydraulically actuated mold clamp assembly by said controlled hydraulic fluid from said first and second pumps for sequential operation of said injection assembly and said mold clamping assembly during simple injection molding and coining operations, a third pump being a low volume pump and having an inlet and an outlet, said inlet of said third pump being connected to said reservoir, said outlet of said third pump being normally connected to said reservoir, and means to isolate said clamp assembly operating means from said controlled hydraulic fluid from said first and second pumps and to connect said outlet of said third pump to said clamping assembly operating means whereby said injection assembly and said clamping assembly can be operated independently and simultaneously during a precision coining operation with precise and repeatable speed and position control of said clamping assembly.

2. A hydraulic system for a toggle operated plastic injection molding machine having a mold clamping assembly and an injection assembly, said mold clamping assembly comprising a fixed platen and a fixed mold part mounted thereon, a movable platen and a movable mold part mounted thereon, and a hydraulic cylinder-operated toggle mechanism to shift said movable platen and mold part between an open position and a final mold closed and clamped position, said mold parts defining a mold cavity when closed, said fixed mold part having a passage from said cavity to an opening in said fixed platen, said injection assembly comprising a cylindrical body terminating at one end in a nozzle, said nozzle being connectable to said passage in said fixed mold part, a hopper mounted on said cylindrical body, a supply of plastic material within said hopper, a screw rotatable and axially shiftable within said cylindrical body, a prime mover operatively connected to said screw to rotate said screw to plasticate said plastic material and accumulate a charge thereof adjacent said nozzle, a hydraulic cylinder to shift said screw axially to inject said charge through said passage in said fixed mold part to said mold cavity, said hydraulic system comprising a reservoir of hydraulic fluid, a first pump being a low volume pump and a second pump being a high volume pump, each of said first and second pumps having an inlet and an outlet, a pressure and flow control manifold means having an outlet, said inlets of said first and second pumps being connected to said reservoir, said outlets of said first and second pumps being connected to said pressure and flow control manifold means, said pressure and flow control manifold means controlling the pressure and flow of hydraulic fluid at its outlet, an injection control manifold means, said pressure and flow control manifold means outlet being connected to said injection control manifold means, said injection control manifold means being connected to said injection assembly cylinder to control the axial position of said screw, a clamping control manifold means, said clamping control manifold means being connected to said cylinder of said clamping assembly to shift said toggle mechanism and said movable platen and mold part, an isolation control manifold means, said outlet of said pressure and flow control manifold means being connected to said isolation manifold means, said isolation manifold means having an outlet connected to said clamping control manifold means, a third pump being a low volume pump and having an inlet connected to said reservoir and an outlet connected to said isolation manifold means, said isolation manifold means having a connection to said reservoir, said isolation manifold means having a normal state wherein it connects said outlet of said pressure and flow control manifold means to said clamping control manifold means and said third pump outlet to said reservoir, said isolation manifold means having an actuated state wherein it isolates said clamping control manifold means from said pressure and flow control manifold means outlet and connects said outlet of said third pump to said clamping control manifold, and a control system to control said pressure and flow control manifold means, said injection control manifold means, said clamping control manifold means and said isolation control manifold means, whereby with said isolation control manifold means in its normal state said injection assembly and clamping assembly can be actuated sequentially by said first and second pumps, said pressure and flow control manifold means and said injection control manifold means and by said first and second pumps, pressure and flow control manifold means and said clamping control manifold means, respectively, for simple conventional injection molding and coining operations, and whereby when said isolation manifold means is in its actuated state said injection assembly and said mold clamping assembly can be independently and simultaneously controlled by said first and second pumps, said pressure and flow control manifold means and said injection control manifold means and by said third pump and said clamping control manifold means, respectively for precision coining operations.

3. The hydraulic system claimed in claim 2 wherein said clamping control manifold comprises a solenoid controlled proportional direction center blocked valve.

4. The hydraulic system claimed in claim 2 wherein said isolation manifold means comprises three valve assemblies, the first valve assembly comprising a check valve, the second valve assembly comprising a solenoid actuated valve, said second valve assembly when unactuated directing flow of hydraulic fluid from said outlet of said pressure and flow manifold means to said clamping control manifold means through said first valve assembly, said second valve assembly when actuated by its solenoid blocking flow of hydraulic fluid from said pressure and flow control manifold means outlet to said clamping control manifold means, said third valve assembly comprising a solenoid actuated valve, said third valve assembly when unactuated directing flow of hydraulic fluid from said outlet of said third pump back to said reservoir, said third valve assembly when actuated by its solenoid directing flow of hydraulic fluid from said outlet of said third pump through said first valve assembly to said clamping control manifold means, said solenoids of said second and third valve assemblies being actuable simultaneously by said control system.

5. The hydraulic system claimed in claim 2 wherein said control system comprises a computer control system having outputs connected to said pressure and flow control manifold means, said injection control manifold means, said clamping control manifold means and said isolation manifold means.

6. The hydraulic system claimed in claim 3 wherein said isolation manifold means comprises three valve assemblies, the first valve assembly comprising a check valve, the second valve assembly comprising a solenoid actuated valve, said second valve assembly directing flow of hydraulic fluid from said outlet of said pressure and flow manifold means to said clamping control manifold means through said first valve assembly, said second valve assembly when actuated by its solenoid blocking flow of hydraulic fluid from said pressure and flow control manifold means outlet to said clamping control manifold means, said third valve assembly comprising a solenoid actuated valve, said third valve assembly when unactuated directing flow of hydraulic fluid from said outlet of said third pump back to said reservoir, said third valve assembly when actuated by its solenoid directing flow of hydraulic fluid from said outlet of said third pump through said first valve assembly to said clamping control manifold means, said solenoids of said second and third valve assemblies being actuable simultaneously by said control system.

* * * * *